United States Patent
Lim et al.

(10) Patent No.: US 10,565,406 B2
(45) Date of Patent: Feb. 18, 2020

(54) ITEM MANAGEMENT SYSTEM USING TAG INFORMATION

(71) Applicant: HANMI HEALTHCARE INC., Gyeonggi-do (KR)

(72) Inventors: Jong hoon Lim, Seoul (KR); Byeong jin Choi, Gyeonggi-do (KR)

(73) Assignee: HANMI HEALTHCARE INC., Gyeonggi-Do (KR)

( * ) Notice: Subject to any disclaimer, the term of this patent is extended or adjusted under 35 U.S.C. 154(b) by 0 days.

(21) Appl. No.: 16/341,135

(22) PCT Filed: Feb. 12, 2018

(86) PCT No.: PCT/KR2018/001787
§ 371 (c)(1),
(2) Date: Apr. 11, 2019

(87) PCT Pub. No.: WO2018/190505
PCT Pub. Date: Oct. 18, 2018

(65) Prior Publication Data
US 2019/0243995 A1    Aug. 8, 2019

(30) Foreign Application Priority Data

Apr. 10, 2017 (KR) .................. 10-2017-0046067

(51) Int. Cl.
*G06Q 30/00* (2012.01)
*G06K 7/10* (2006.01)
(Continued)

(52) U.S. Cl.
CPC .......... *G06K 7/10099* (2013.01); *G06K 7/10* (2013.01); *G06K 17/00* (2013.01); *G06K 19/07* (2013.01);
(Continued)

(58) Field of Classification Search
CPC ....... G06Q 10/087; G06Q 10/08; G06Q 10/06
(Continued)

(56) References Cited

U.S. PATENT DOCUMENTS 7,518,511 B1 * 4/2009 Panja .................... G06Q 10/08
340/572.1
2012/0274450 A1 * 11/2012 Tuttle ................... G06K 7/0008
340/10.1
(Continued)

FOREIGN PATENT DOCUMENTS

JP       2014-216726 A    11/2014
KR   10-2009-0060613 A     6/2009
(Continued)

OTHER PUBLICATIONS

International Search Report for PCT/KR2018/001787 dated May 10, 2018.

*Primary Examiner* — Ahshik Kim
(74) *Attorney, Agent, or Firm* — The PL Law Group, PLLC

(57) ABSTRACT

An item management system using tag information includes a wireless tag provided to each of a plurality of products; first to $n^{th}$ (n is a natural number equal to or greater than 2) readers provided at different locations to receive tag information from the wireless tag; and a control module configured to control the first to $n^{th}$ readers, wherein the control module includes a receiving unit configured to receive the tag information; an information generating unit configured to generate the received tag information and response frequency information representing receipt of the tag information for each of the first to $n^{th}$ readers; and a location information generating unit configured to generate location information of the wireless tag by using the response frequency information and the location information of the first to $n^{th}$ readers.

5 Claims, 8 Drawing Sheets

(51) Int. Cl.
*H04N 7/18* (2006.01)
*G06K 19/077* (2006.01)
*H04W 4/35* (2018.01)
*G06K 19/07* (2006.01)
*G06K 17/00* (2006.01)
*G06Q 10/08* (2012.01)

(52) U.S. Cl.
CPC ....... *G06K 19/07758* (2013.01); *G06Q 10/08* (2013.01); *H04N 7/18* (2013.01); *H04N 7/181* (2013.01); *H04N 7/188* (2013.01); *H04W 4/35* (2018.02)

(58) Field of Classification Search
USPC ......................................................... 235/385
See application file for complete search history.

(56) References Cited

U.S. PATENT DOCUMENTS

| 2014/0337434 | A1* | 11/2014 | Hansen | G06Q 50/10 |
| | | | | 709/204 |
| 2015/0319575 | A1* | 11/2015 | Chen | H04W 4/023 |
| | | | | 455/456.3 |
| 2015/0339951 | A1* | 11/2015 | Stevens | G06K 9/00664 |
| | | | | 348/62 |
| 2018/0374357 | A1* | 12/2018 | Hosokawa | G06F 16/29 |

FOREIGN PATENT DOCUMENTS

| KR | 10-2011-0102720 A | 9/2011 |
| KR | 10-2012-0057835 A | 6/2012 |
| KR | 10-2012-0085548 A | 8/2012 |
| KR | 10-1425505 B1 | 8/2014 |

* cited by examiner (a)

(b)

ITEM MANAGEMENT SYSTEM USING TAG INFORMATION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/001787, filed on Feb. 12, 2018, which claims priority to the benefit of Korean Patent Application No. 10-2017-0046067 filed in the Korean Intellectual Property Office on Apr. 10, 2017, the entire contents of which are incorporated herein by reference.

TECHNICAL FIELD

The present disclosure relates to an item management system, and more particularly, to a product management system using tag information, which generates location information of a product to which a tag is attached and transfer route data of the product by using information about the number of times or frequency of receiving the tag information and organically combines transfer route data of an object extracted from image data with the transfer route data of the product or the like to further optimize the product management.

BACKGROUND ART

In order to improve the efficiency of product management, a system in which a tag (TAG) containing information capable of representing characteristics of a product is attached to the product and the tag is recognized in a contact way or a contactless way to manage the product is applied to a POS (Point of Sale) system of a market or a stall, a logistics system, a delivery system and the like.

This system is mainly used to identify an object of the product to be sold or transferred, and is configured so that a tag such as a bar code and a QR code attached to the product is recognized and the recognized information is databased to perform post-processing such as collection, statistics, storage or processing of the information.

Recently, in order to solve inherent problems of the bar code (or, the QR code) that allows recognition of information using an optical signal, namely the recognition distance is short and the recognition is impossible when there is an obstacle between a reader and the tag, a method of recognizing and utilizing a tag of a product remotely in a non-contact way through a radio signal transmission and reception using a NFC tag or a RFID tag (RF tag) is used more and more.

Among them, the RF tag using a RF signal may be classified into a passive type, an active type and a semi-passive type depending on whether the power in the RF tag is used for accessing and reading the information recorded in a tag chip and transmits the read information to a reader.

The technology using RFID (Radio Frequency IDentification) is used in various fields since the RF tag attached to a product (article) is recognized using a radio wave to allow collection, storage and tracking of the information of each product (article). Recently, there is also introduced a method of estimating a location of a RF tag or a product to which the RF tag is attached, by using the received signal strength identification (RSSI) of the RF tag received from a plurality of readers (antennas).

However, this method has a problem that the signal intensity value is distorted under an environment where the signal has low accuracy and is vulnerable to interference because the resolution is low when the signal intensity is not larger than a threshold value.

Moreover, the method of calculating and utilizing the location information using RSSI requires an additional complicated structure for measuring and analyzing the intensity of received signals. For this reason, the conventional system environment using the RF tag is not able to be used as it is, and thus there is an inherent limit in terms of expandability and versatility.

In addition, a method using GPS information is also disclosed as the method of calculating a location of a tag. However, even though this method has an advantage that the location information is relatively accurately calculated, the method should have an additional configuration, which gives the same problem as the method using RSSI. Also, this method is not applicable at all in a room where a signal is not received from a GPS satellite. In addition, if the number of products is large, a GPS module is required for each product, and thus the efficiency is extremely low in terms of cost.

SUMMARY

The present disclosure is designed to solve the problems of the related art, and therefore the present disclosure is directed to providing a product management system, which may utilize an infrastructure of an existing product management system using a RF tag by calculating and using location information or the like of a tag in a simple way using the number of times or frequency of receiving wireless tags that are differentially sent from a plurality of readers.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an item management system using tag information, comprising: a wireless tag provided to each of a plurality of products; first to $n^{th}$ (n is a natural number equal to or greater than 2) readers provided at different locations to receive tag information from the wireless tag; and a control module configured to control the first to $n^{th}$ readers, wherein the control module includes: a receiving unit configured to receive the tag information; an information generating unit configured to generate the received tag information and response frequency information representing receipt of the tag information for each of the first to $n^{th}$ readers; and a location information generating unit configured to generate location information of the wireless tag by using the response frequency information and the location information of the first to $n^{th}$ readers.

In this case, if two or more readers among the first to $n^{th}$ readers receive the same tag information, the location information generating unit of the present disclosure may generate the location information of the corresponding wireless tag by using a difference in the response frequency information of the corresponding wireless tag, and the location information generating unit may generate the location information of the corresponding wireless tag by proportionally applying a difference in response frequency of the corresponding tag information received from the respective readers to a separation distance between the two or more readers receiving the same tag information.

In addition, the reader of the present disclosure may include a specification varying unit for variably adjusting a transmission cycle in which the wireless tag transmits the tag information, and the control module may further include a communication control unit for controlling the specification varying unit to shorten the transmission cycle when the response frequency information is lower than a reference frequency or when the difference in the response frequency information of the readers receiving the same tag information is lower than a reference difference.

Moreover, the control module of the present disclosure may further include a route generating unit configured to generate route data of the wireless tag when the location information of the wireless tag is changed.

More preferably, the control module of the present disclosure may further include an image storing unit configured to receive and store image data from a plurality of imaging means that photograph images of regions of the first to $n^{th}$ readers; a tracking image extracting unit configured to extract tracking image data, which is image data of a time zone in which a location change occurs, from the image data of a region where the location change occurs when the location information of the wireless tag is changed; and a data processing unit configured to store the extracted tracking image data in association with the information of the wireless tag whose location information is changed.

In addition, the control module of the present disclosure may further include a DB unit in which transfer-planned product information is stored, and the tracking image extracting unit may extract the tracking image data only when the wireless tag whose location information is changed does not correspond to the transfer-planned product information.

In another embodiment of the present disclosure, the control module of the present disclosure may further include an image storing unit configured to receive and store image data from a plurality of imaging means that photograph images of regions of the first to $n^{th}$ readers; an object route generating unit configured to sense an object by analyzing the received image data and generate route data of the sensed object by matching coordinate information in the image data of the object with actual physical location coordinate information; and an integrated information unit configured to store integrated information in which the information about the wireless tag and the information of the object matched with each other are associated, when the route data of the wireless tag and the route data of the object are matched over reference similarity.

Further, the integrated information unit of the present disclosure may match the sensed object with stored photograph or feature point information to extract identity information of the sensed object and store the extracted identity information to be included in the integrated information.

More preferably, the route generating unit of the present disclosure may generate the route data of the wireless tag only when the object route generating unit generates the route data of the sensed object.

The item management system using a wireless tag according to the present disclosure may utilize a system environment such as a wireless tag and a reader which is already built, thereby making it possible to expand the product management system more universally.

According to an embodiment of the present disclosure, since the location information and the transfer route information of a wireless tag, namely a product (article) to which the wireless tag is attached, may be generated using the information about the number of times or frequency of receiving signals of the wireless tag, it is possible to minimize an additional configuration for generating location information or the like, and it is also possible to deal with the distortion, obstacle or the like of the signal environment more strongly by using only the differential reception frequency information.

According to another embodiment of the present disclosure, by organically applying a configuration that variably adjusts the transmission cycle in which the wireless tag transmits tag information in association with the size of the difference of the response signal frequencies received from the wireless tags, it is possible to dynamically implement the environment optimized for a current situation, thereby calculating and utilizing more accurate location information.

Further, the present disclosure may allow synthetic information related to the transfer of a product, the subject (a person or a vehicle) transferring the product or the like to be integrally managed and operated by performing post-processing such as tracking an object such as a person by using the image data or matching the transfer route data of the tracked object with the transfer route data of the product.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 8 is a diagram showing an example of an interface environment of integrated information provided to a manager or the like.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
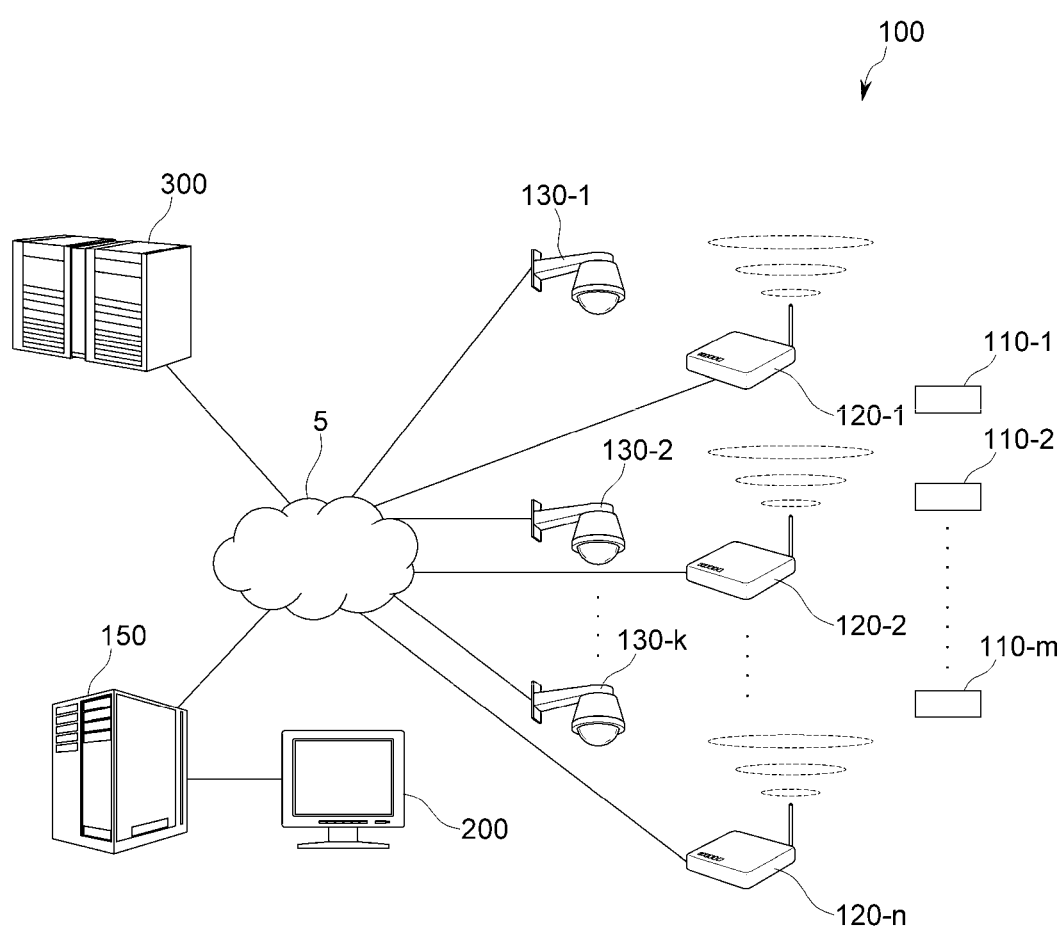
FIG. 1 is a diagram schematically showing an item management system according to an embodiment of the present disclosure and relevant configurations.

FIG. 1 is a diagram schematically showing an item (product) management system 100 (hereinafter, referred to as a 'management system') according to an embodiment of the present disclosure and relevant configurations, As shown in FIG. 1, the management system 100 of the present disclosure may include a plurality of wireless tags 110 (110-1, 110-2, . . . , 110-$m$), a plurality of readers 120 120-1, 120-2, . . . , 120-$n$ provided at different locations, and a control module 150. Here, m and n are natural numbers equal to or greater than 2.

The wireless tag 110 is provided for each of a plurality of products (articles), and tag information such as characteristic information and specification information of the product is recorded contained in the wireless tag 110. Also, the wireless tag 110 transmits the contained tag information to the reader 120 as a response to an external control signal.

The wireless tag 110 may be implemented with an RF tag (RFID tag) considering the information size, signal responsiveness, signal reception distance, price and versatility. However, the wireless tag 110 may also be implemented in various forms without being limited to its name as long as the wireless tag may contain information about a product and wirelessly transmit the information to the outside.

The reader 120 of the present disclosure corresponds to a configuration for receiving tag information from the wireless tag 110 and transmitting the tag information to the control module 150 in which the processing of the present disclosure is implemented. As explained later, location information of the wireless tag 110, namely a product to which the wireless tag 110 is attached, is calculated based on location information of the reader 120, and thus it is preferable that different readers 120 are provided at different locations.

Each reader 120 of the present disclosure transmits a response request signal for requesting transmission of the tag information to the wireless tag 110 located in its own signal region, and the wireless tag 110 transmits the tag information thereof to the reader 120 according to a defined communication specification in response to the response request signal.

In an embodiment, the management system 100 of the present disclosure may further include an imaging means 130 (130-1, 130-2, . . . , 130-$k$) (here, k is a natural number equal to or greater than 2) depicted in FIG. 1.

The imaging means 130 is installed in a place or space where the product to which the wireless tag 110 is attached is stored or managed and photographs an image. As explained later, the imaging means 130 is preferably installed in plural for specific regions in order to effectively sense the transfer of a user or an object that enters or exits the management place and to generate transfer route data of the object.

As explained later, the route data of the wireless tag 110 (specifically, the product to which the wireless tag is attached) is calculated using receipt frequency (response frequency information) of the tag information of each reader 120. Since the route data is based on the location information of the reader 120, the imaging means 130 may be preferably provided in plural so that images of regions having the respective readers 120 may be photographed, even though the number of the imaging means 130 need not be necessarily identical to the number of the readers 120.

The control module 150 of the present disclosure is a main configuration of the present disclosure that controls and manages the communication environment of the plurality of the readers 120. The control module 150 functions to collect tag information received from the plurality of the reader 120 and integrally manage the tag information, and also functions to store, process and utilize the image data received from the imaging means 130.

As shown in FIG. 1, the control module 150 of the present disclosure may be configured to provide information about product transfer and tracked image, tracking image data, and the like to a display unit 200 as a user-oriented interface environment. FIG. 1 shows an example in which the control module 150 of the present disclosure is implemented in the form of a server. However, it is just an example, and the control module 150 may be implemented in various forms such as a PC, a terminal device and a module.

The control module 150 of the present disclosure is communicatively connected to an external server 300 so that the information about product management may be shared, and the control module 150 may receive the information about the product, the modeling data about a place where the product is stored, and the like from the external server 300 to manage the product and implement the user interface environment more effectively.

Meanwhile, since the product to which the wireless tag 110 is attached inherently has mobility, the communication environment between the wireless tag 110 and the reader 120 may be preferably implemented in a wireless environment.

The communication between the reader 120 and the control module 150 of the present disclosure or between the external server 300 or the imaging means 130 and the control module 150 of the present disclosure may employ any of wireless and wired environments as long as the communicate is available.

In this regard, a communication network 5 may include a wired network such as the Internet, called WWW (World Wide Web), and an intranet, and/or a wireless network such as a cellular telephone network, LTE, Bluetooth, WiFi, wireless LAN and/or metropolitan area network (MAN).

Hereinafter, the detailed configuration and processing of the present disclosure will be described in detail with reference to the accompanying drawings.

Figure 2:
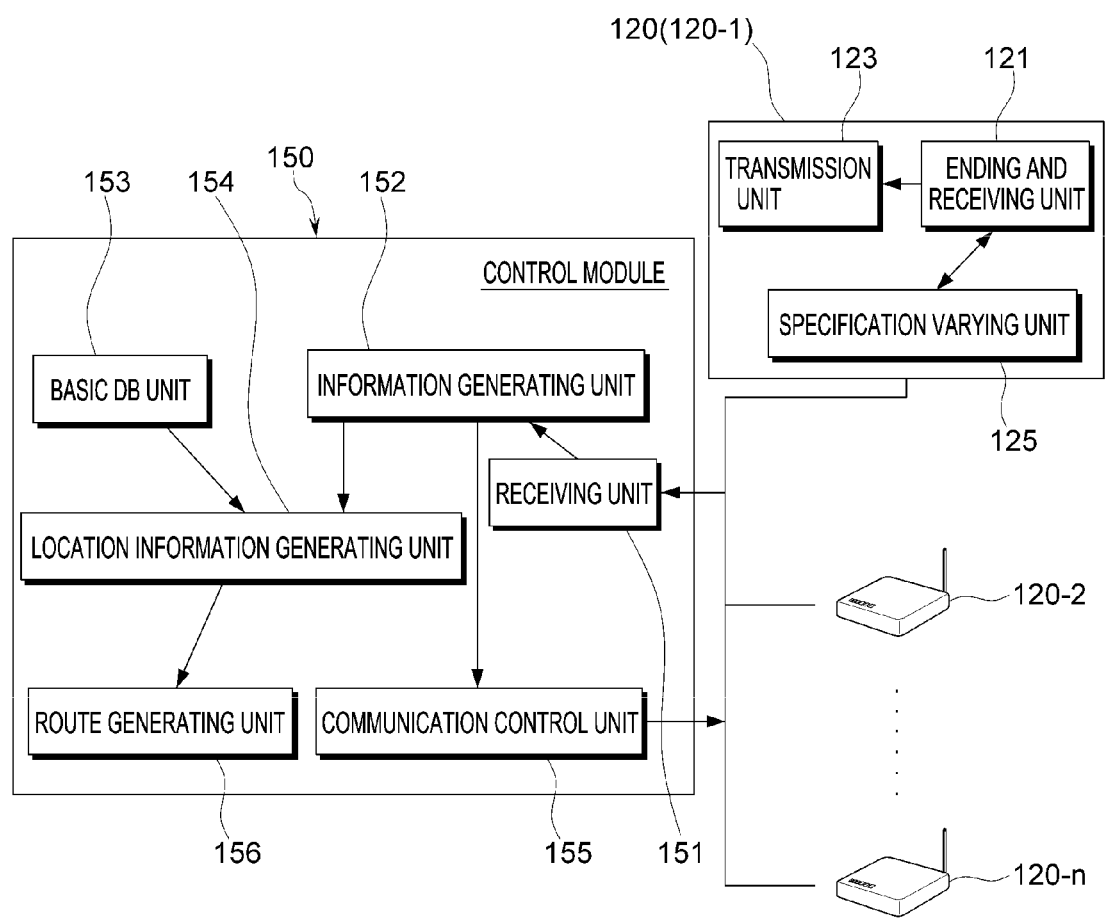
FIG. 2 is a block diagram showing a detailed configuration of the product management system according to an embodiment of the present disclosure.
Figure 3:
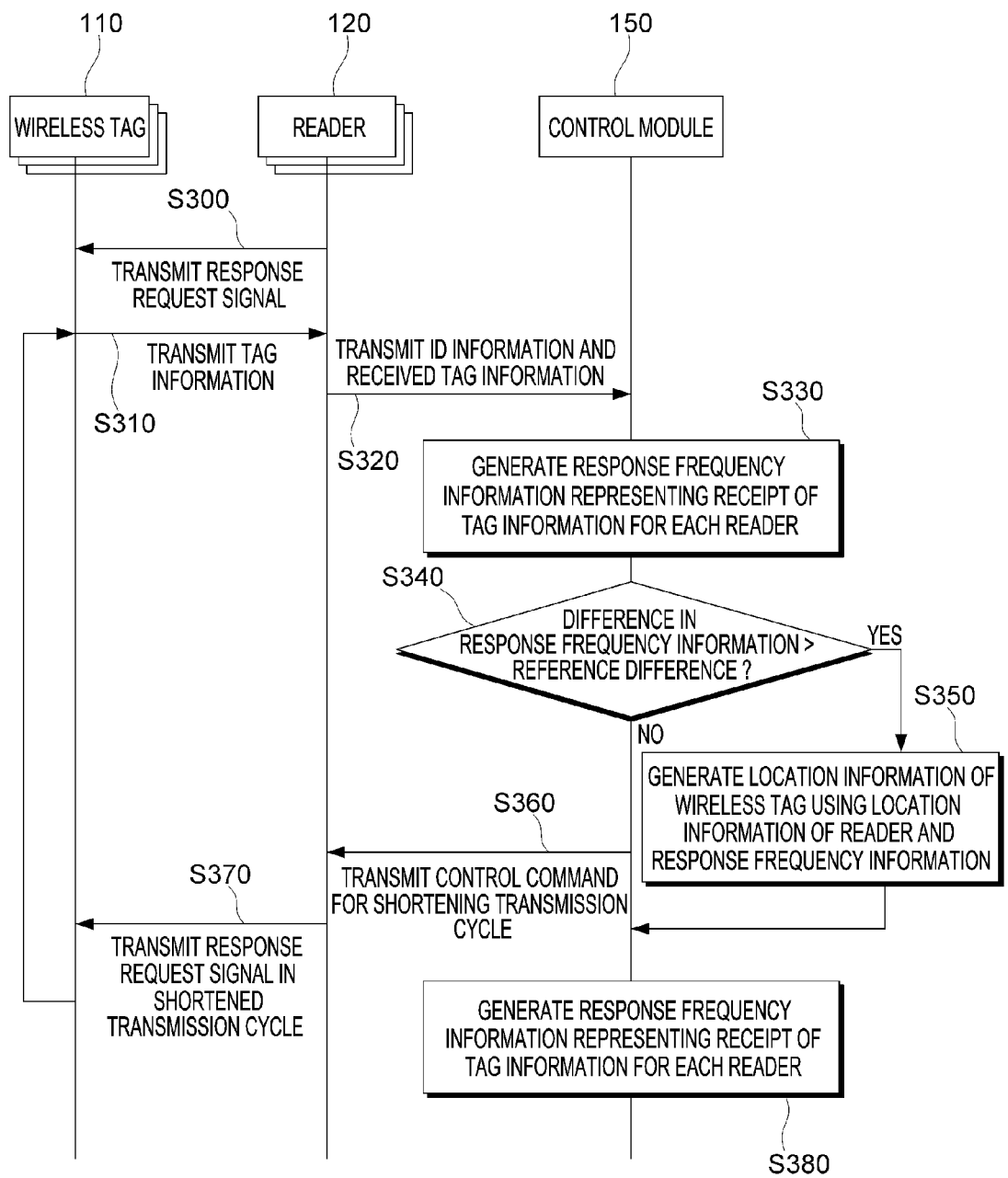
FIG. 3 is a flowchart for illustrating processes of an item management method according to an embodiment of the present disclosure.

FIG. 2 is a block diagram showing the control module 150 and the reader 120 of the product management system 100 according to an embodiment of the present disclosure, and FIG. 3 is a flowchart for illustrating processes of a product management method according to an embodiment of the present disclosure.

As shown in FIG. 2, the control module 150, which is a component of the management system 100 of the present disclosure, includes a receiving unit 151, an information generating unit 152, a basic DB unit 153, a location information generating unit 154, a communication control unit 155, and a route generating unit 156. The reader 120 of the present disclosure may include a sending and receiving unit 121, a transmitting unit 123, and a specification varying unit 125.

Prior to explaining the present disclosure in detail, it should be understood that components of the present disclosure as depicted in FIG. 2 etc. are not physically distinguished but logically distinguished.

In other words, each component corresponds to a logic component for implementing a technical feature of the present disclosure, and thus even though any components are integrated or divided, it should be interpreted as falling within the scope of the present disclosure as long as the function of the logic component of the present disclosure is accomplished. Also, any components having identical or similar functions should be interpreted as falling within the scope of the present disclosure regardless whether their terms are identical or not.

As described above, the reader 120 of the present disclosure is provided in plural at different locations, receives the tag information from the wireless tag 110 located in a signal region thereof, and performs only processing of the present disclosure, explained later.

In the following description, since the reader 120 of the present disclosure is provided in plural, the readers are called first to $n^{th}$ readers (n is a natural number equal to or greater than 2) in order to classify the readers. However, if the readers perform the same function, the first to $n^{th}$ readers 120-1, 120-2, . . . , 120-$n$ will be generally called the reader 120. The plurality of wireless tags 110 and the plurality of imaging means 130 will also be called in the same way.

The sending and receiving unit 121 of the reader 120 transmits a response request signal for requesting transmission of the tag information to the wireless tag 110 located in the signal region of the reader 120 (S300). If the response request signal of the reader 120 is received, the wireless tag 110 transmits its tag information to the wireless environment according to the defined communication specification (S310). The tag information transmitted from the wireless tag 110 is received by the sending and receiving unit 121 of the reader 120.

The receiving unit 151 of the control module 150 receives the tag information, which is received by the reader 120 from the wireless tag 110, from each of the first to $n^{th}$ readers 120-1, 120-2, . . . , 120-$n$ (specifically, from the transmitting unit 123 of the reader) (S320).

If the tag information is received by the receiving unit 151, the information generating unit 152 of the control module 150 generates response frequency information of the tag information accumulated for a predetermined time (for example, 10 seconds, 30 seconds, 1 minute, or the like) as in Table 1 below, and preferably generates the response frequency information for each of the first to $n^{th}$ readers 120-1, 120-2, . . . , 120-$n$ (S330).

TABLE 1

| reader | first reader | | second reader | | | ... | n-1$^{th}$ reader | | n$^{th}$ reader | |
|---|---|---|---|---|---|---|---|---|---|---|
| received tag (T) information | #1T | #2T | #2T | #3T | #4T | ... | #3T | #7T | #7T | #9T |
| tag information response frequency (P) | 10 | 9 | 8 | 7 | 1 | ... | 2 | 9 | 9 | 8 |
| response rate $\dfrac{P}{(A/B)}$ | 33% | 30% | 27% | 23% | 3% | | 7% | 30% | 30% | 27% |
| specification response rate $\dfrac{P}{(A/(f(B,C))}$ | 100% | 90% | 80% | 70% | 10% | ... | 20% | 90% | 90% | 80% |
| accumulated time (A) (sec) | 30 seconds | | | | | | | | | |
| response request signal transmission cycle (B) (sec) | 1 second | | | | | | | | | |
| response specification (C) (sec) | sleep mode for "3 seconds" after responding to the response request signal | | | | | | | | | |

Seeing to the example illustrated in the table, the wireless tags received by the first reader 120-1 are the first wireless tag 110-1 and the second wireless tag 110-2, and based on an accumulative time of 30 seconds, the response frequency information of the first wireless tag 110-1 is 10 times based on an accumulative time of 30 seconds, and the response frequency information of the second wireless tag 110-2 is 9 times.

In the table, the response request signal transmission cycle (B) is a cycle in which the reader 120 transmits a command signal to transmit a signal to the peripheral wireless tags 110, namely a response request signal. In the example of the above table, the reader 120 sends the response request signal once every second.

The response specification (C) is a specification of the cycle in which the wireless tag 110 transmits the tag information and may be contained in the response request signal transmitted by the reader 120 and be transmitted to the wireless tag 110. The response specification (C) corresponds to a specification defining how the wireless tag 110 should make a response.

In the example of the above table, the response specification (C) corresponds to a specification defining that after the response request signal is received and responded, the mode is switched to a sleep mode for 3 seconds and then the response request signal is responded again. In the sleep mode time zone of 3 seconds, the wireless tag 110 does not make a response at all. Considering the actual signal processing time, the sleep mode time may be 2.7 to 2.99 seconds, which is slightly less than 3 seconds.

In the table, the response rate represents a percentage of the actual response frequency information (P) based on a maximum response frequency (A/B) considering the response request signal transmission cycle (B) during the accumulative time (A), and the specification response rate means an actual response rate reflecting the sleep mode time of the response specification (C). In the specification response rate, f(B,C) means a greater number or an equal number of two variables. In Table 1, since f(B,C)=f(1,3), f(B,C) becomes 3.

For example, since the response frequency of the first wireless tag 110-1 received by the first reader 120-1 is 10 times, the response rate becomes 33% compared to the maximum response frequency of 30 times (30 seconds/1 second), and the specification response rate reflecting the sleep mode of 3 seconds becomes 100% because it is based on 10 times (30 seconds/(3 seconds)).

The embodiment of the present disclosure using the response rate and the specification response rate will be described later.

If the information generating unit 152 of the control module 150 generates the wireless tag information received by each reader 120 and the response frequency information of the received wireless tag information (S330), the location information generating unit 154 of the control module 150 estimates and generates the location information of each wireless tag 110 by using the actual location information of each reader 120 stored in the basic DB unit 153 and the response frequency information (S380).

In the example of Table 1 above, the first wireless tag 110-1 is received only by the first reader 120-1 and the specification response rate corresponds to 100%. Thus, the location information of the first wireless tag 110-1, namely a product to which the first wireless tag 110-1 is attached, corresponds to a location where the first reader 120-1 is installed, and thus it is possible to estimate and calculate that the location is physically very close to the first reader 120-1.

In an embodiment, the location information of the first wireless tag 110-1 may be calculated as coordinate information of the first reader 120-1, and the location information may also be calculated by performing a geometric processing using whether the response frequency or the response rate (the specification response rate) is large or small based on the actual location information of the first reader 120-1.

If the same tag information is received by two or more readers among the first to $n^{th}$ readers, the location information generating unit 154 of the present disclosure may also generate the location information of the corresponding wireless tag by using the difference in the response frequency information of the corresponding tag information.

In the example of Table 1 above, even though the third wireless tag 110-3 is received together with the second reader 120-2 by the n–1$^{th}$ reader 120-n–1, its response frequency information is 7 times at the second reader but just 2 times at the n–1$^{th}$ reader.

Since the intensity of the communication signal is typically reduced in proportion to the square of the distance, it may be estimated that the third wireless tag 110-3 is located between the second reader 120-2 and the n–1$^{th}$ reader 120-n–1, and based on this estimation, the location information of the third wireless tag 110-3 may be generated by proportionally applying the difference in the response frequency information.

Since the response frequency information of the third wireless tag 110-3 is overwhelming at the second reader 120-2, the location information of the third wireless tag 110-3 may be generated as a location value of the second reader 120-2.

In an embodiment, the location information of the corresponding wireless tag may also be generated by proportionally applying the difference in the response frequency of the corresponding tag information received from the respective readers to the separation distance between the two or more readers receiving the same tag information.

If the response frequency information illustrated in Table 1 or the like is lower than the reference frequency or the difference in the response frequency information of the plurality of readers receiving the same tag information is lower than the reference difference (S340), the communication control unit 155 of the control module 150 transmits a control command for shortening the transmission cycle, in which the wireless tag 110 transmits the tag information to the reader 120, to the reader 120 (S360).

The reference frequency or the reference difference may be variably set according to an embodiment, with the efficiency of signal processing or the accuracy of information as a parameter.

If the response frequency information is lower than the reference frequency, the reliability of the response frequency may be low. Thus, the transmission cycle is controlled to be shortened to increase the response frequency.

If the transmission cycle is controlled to be shortened, the communication traffic or the like increases relatively, so the overall actual recognition rate of the wireless tag 110 may be lowered. However, the number of samples of the response frequency information received from the wireless tags 110 within an effective distance may be increased.

If the control command for shortening the transmission cycle is received from the communication control unit 155 of the control module 150 to the reader 120 as described above, the specification varying unit 125 of the reader 120 transmits a transmission cycle in which the wireless tag transmits the tag information, namely a control signal recording the shortened response specification (C) information, to the wireless tag 110 (S370).

If the response specification C is changed (shortened), the wireless tag 110 transmits its tag information according to the changed response specification (C), namely the changed sleep mode time (S310).

Table 2 below illustrates an example in which the response specification, namely the cycle in which the wireless tag transmits the tag information, namely the sleep mode time, in the example of Table 1 is shortened from 3 seconds to 2 seconds.

TABLE 2

| reader | first reader | | second reader | | ... | n-1$^{th}$ reader | | n$^{th}$ reader | |
| --- | --- | --- | --- | --- | --- | --- | --- | --- | --- |
| received tag (T) information | #1T | #2T | #2T | #3T | ... | #3T | #7T | #7T | #9T |
| tag information response frequency (P) | 15 | 14 | 11 | 11 | ... | 3 | 14 | 12 | 13 |
| response rate $\frac{P}{(A/B)}$ | 50% | 47% | 37% | 37% | | 10% | 47% | 40% | 43% |

TABLE 2-continued

| reader | first reader | | second reader | | ... | n-1$^{th}$ reader | | n$^{th}$ reader | |
|---|---|---|---|---|---|---|---|---|---|
| received tag (T) information | #1T | #2T | #2T | #3T | ... | #3T | #7T | #7T | #9T |
| specification response rate $\dfrac{P}{(A/(f(B, C))}$ | 100% | 93% | 73% | 73% | ... | 20% | 93% | 80% | 87% |

| | |
|---|---|
| accumulated time (A) (sec) | 30 seconds |
| response request signal transmission cycle (B) (sec) | 1 second |
| response specification (C) (sec) | sleep mode for "2 seconds" after responding to the response request signal |

Since the sleep mode is shortened from 3 seconds to 2 seconds, after transmitting the tag information in response to the received response request signal (the signal transmitted by the readers), all wireless tags 110 respond to the response request signal again 2 seconds later, and thus the frequency of transmitting the tag information increases.

If the specification is changed to increase the frequency of transmitting the tag information, as the wireless tag 110 is substantially closer to the reader 120, the wireless tag 110 may response to the changed specification well, and if the wireless tag 110 is farther away from the physical distance, the reactivity to the changed specification is lowered.

In the present disclosure, by reflecting the above characteristics, if the response frequency information is low or the difference in the response frequency information of the respective readers receiving the same tag information is lower than the reference difference, the transmission cycle (the response specification) is controlled to be shortened to increase the discrimination of the response frequency information and the difference in the response frequency information.

If the transmission cycle is controlled to be shortened, the frequency increases but the overall recognition rate becomes low as described above. Thus, the fourth wireless tag 110-4 received by the second reader 120-2 in the example of Table 1 may not be sensed in the example of Table 2.

If the transmission cycle is controlled to be shortened, for example, the response frequency information of the second wireless tag 110-2 is changed from 9 times to 14 times and from 8 times to 11 times respectively at the first reader and the second reader, and the difference value is also greatly increased from one time (the difference between 9 times and 8 times) to three times (the difference between 14 times and 11 times), so it is possible to check that the second wireless tag 110 is close to the actual first reader 120-1.

In addition, if the location information generating unit 154 of the present disclosure generates the location information of each wireless tag 110 as described above, the route generating unit 156 of the control module 150 according to the present disclosure may generate route data of the wireless tag 110 by combining the location information in time series. In particular, the route generating unit 156 of the present disclosure is preferably configured to generate the route data of the wireless tag 110 by using the changed location information whenever the location information of the wireless tag generated by the location information generating unit 154 is changed.

Figure 4:
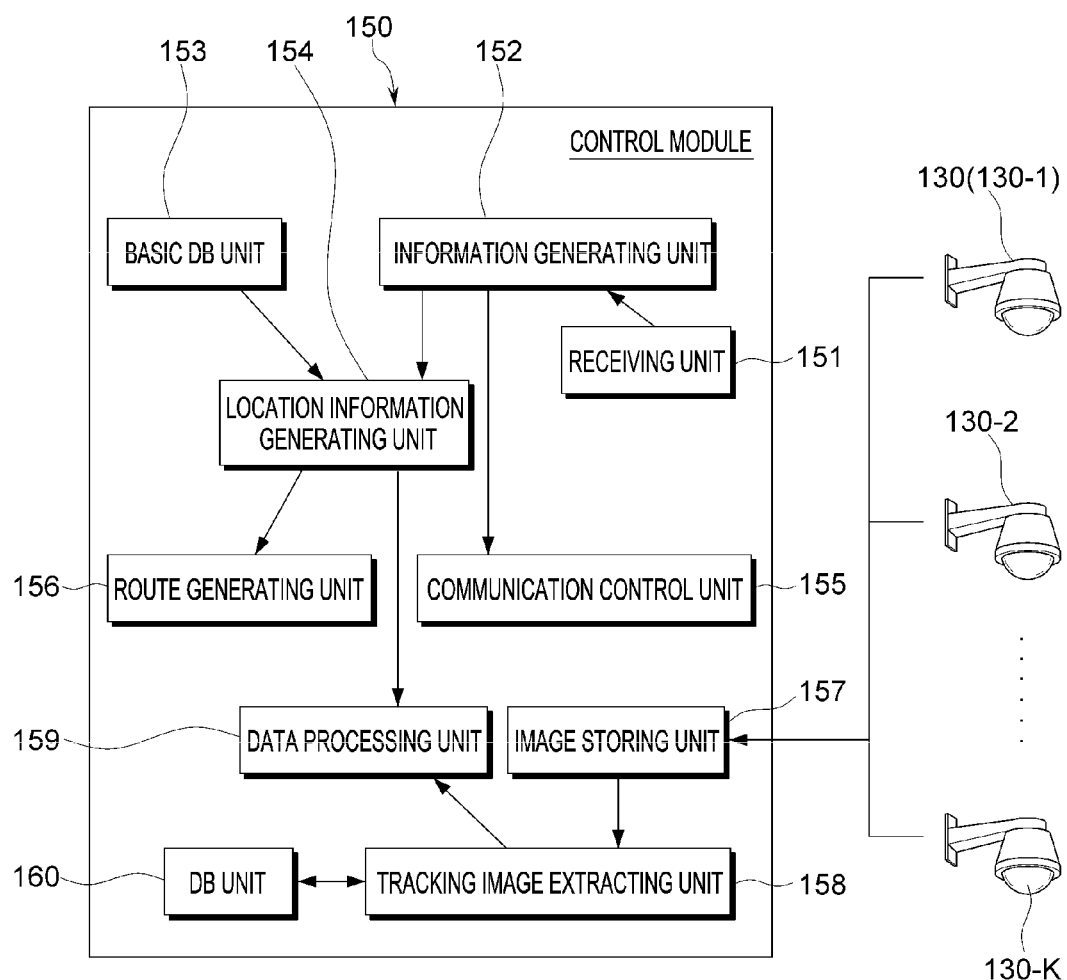
FIG. 4 is a block diagram showing a detailed configuration of an item management system according to another embodiment of the present disclosure.
Figure 5:
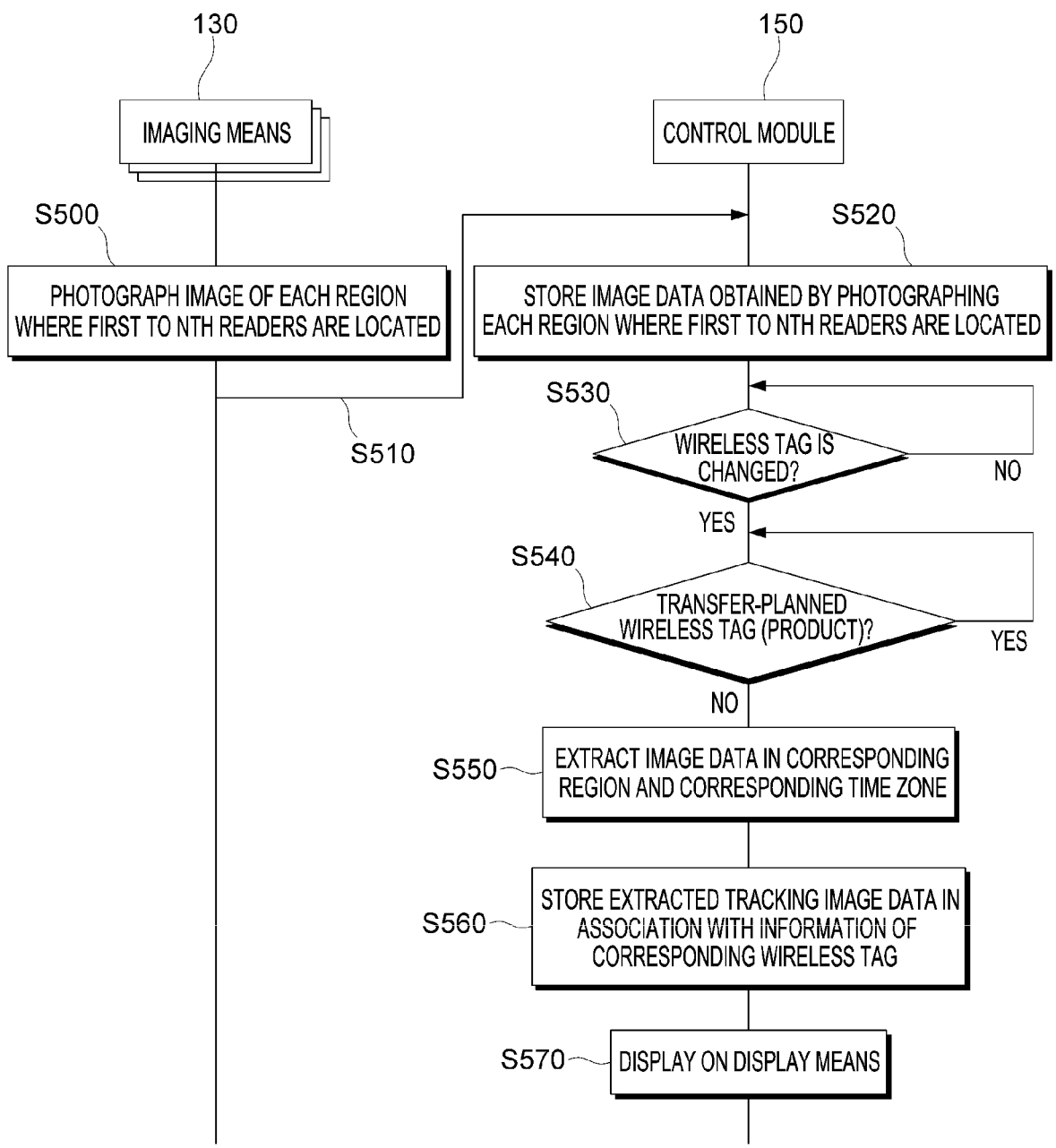
FIG. 5 is a flowchart for illustrating processes of an item management method according to another embodiment of the present disclosure.

FIG. 4 is a block diagram showing a detailed configuration of a product management system 100 according to another embodiment of the present disclosure, and FIG. 5 is a flowchart for illustrating processes of a product management method according to another embodiment of the present disclosure.

Another embodiment of the present disclosure shown in FIGS. 4 and 5 corresponds to an embodiment utilizing the imaging means 130 additionally. The configuration and processing illustrated in FIG. 4, which have already fully described with reference to FIGS. 2 and 3, will not be described in detail again.

As shown in FIG. 4, the control module 150 of the present disclosure may further include an image storing unit 157, a tracking image extracting unit 158, a data processing unit 159, and a DB unit 160 according to an embodiment.

As described above, the imaging means 130 is provided in plural, and each imaging means 130 photographs an image of each region where the first to n$^{th}$ readers 120-1, 120-2, . . . , 120-n are located (S500) and transmits the photographed image data to the control module 150 of the present disclosure (S510).

In this regard, the imaging means 130 may be provided in the same number as the number of the readers 120. However, since the photographing region may be moved or expanded by controlling an angle of view, a focal length and PTZ (Pan, Tilt, Zoom) of the imaging means 130, the imaging means 130 may be provided in an appropriate number reflecting the above.

The image storing unit 157 of the control module 150 receives and stores the image data respectively photographed by the plurality of imaging means 130-1, 130-2, . . . , 130-k from the plurality of imaging means 130-1, 130-2, . . . , 130-k (S520).

As described above with reference to FIGS. 2 and 3, if the location information of the wireless tag 110 is changed (S530), namely if the wireless tag 110 is transferred, the tracking image extracting unit 158 of the present disclosure selects image data about the corresponding region where the location change is changed, from the image data stored in the image storing unit 157, and extracts tracking image data which is the image data of the time zone where the wireless tag 110 is transferred, from the selected image data of the corresponding region (S550).

If the tracking image data is extracted, the data processing unit 159 of the present disclosure stores the extracted tracking image data in association with the information of the wireless tag 110 whose location information is changed (S560).

The image data stored in the image storing unit 157 may be directly checked by a user or the like. However, if the wireless tag 110 is transferred as above, the image of the region where the wireless tag 110 is transferred and the corresponding time zone is automatically extracted and utilized, and further the information about the transferred wireless tag 110 is associated with the tracking image data, thereby allowing more rapid and accurate checking.

The information related to the transferred wireless tag 110 and the information in which the time zone in which the transfer occurs and the tracking image data of the corresponding region are associated are displayed on the display means 200 in a user-oriented interface environment (S570), so that a user or a manager is guided to easily and accurately check the information about the product transfer in an integrated manner.

More preferably, the control module 150 of the present disclosure may further include the DB unit 160 in which transfer-planned product information is stored. The tracking image extracting unit 158 of the present disclosure is configured to generate the tracking image data only when the wireless tag 110 whose location information is changed does not correspond to the transfer-planned product information (S540).

Since the extracted image data or the like is generated only when the transfer-unplanned product is transferred through the above configuration, the efficiency of data processing may be further improved, and the efficiency of checking the information and securing a post-test evidence may be further enhanced.

Since the tracking image data may include an image of a person located in the region in the time zone in which the wireless tag is transferred, it is possible to quickly and accurately check who has transferred the product.

Figure 6:
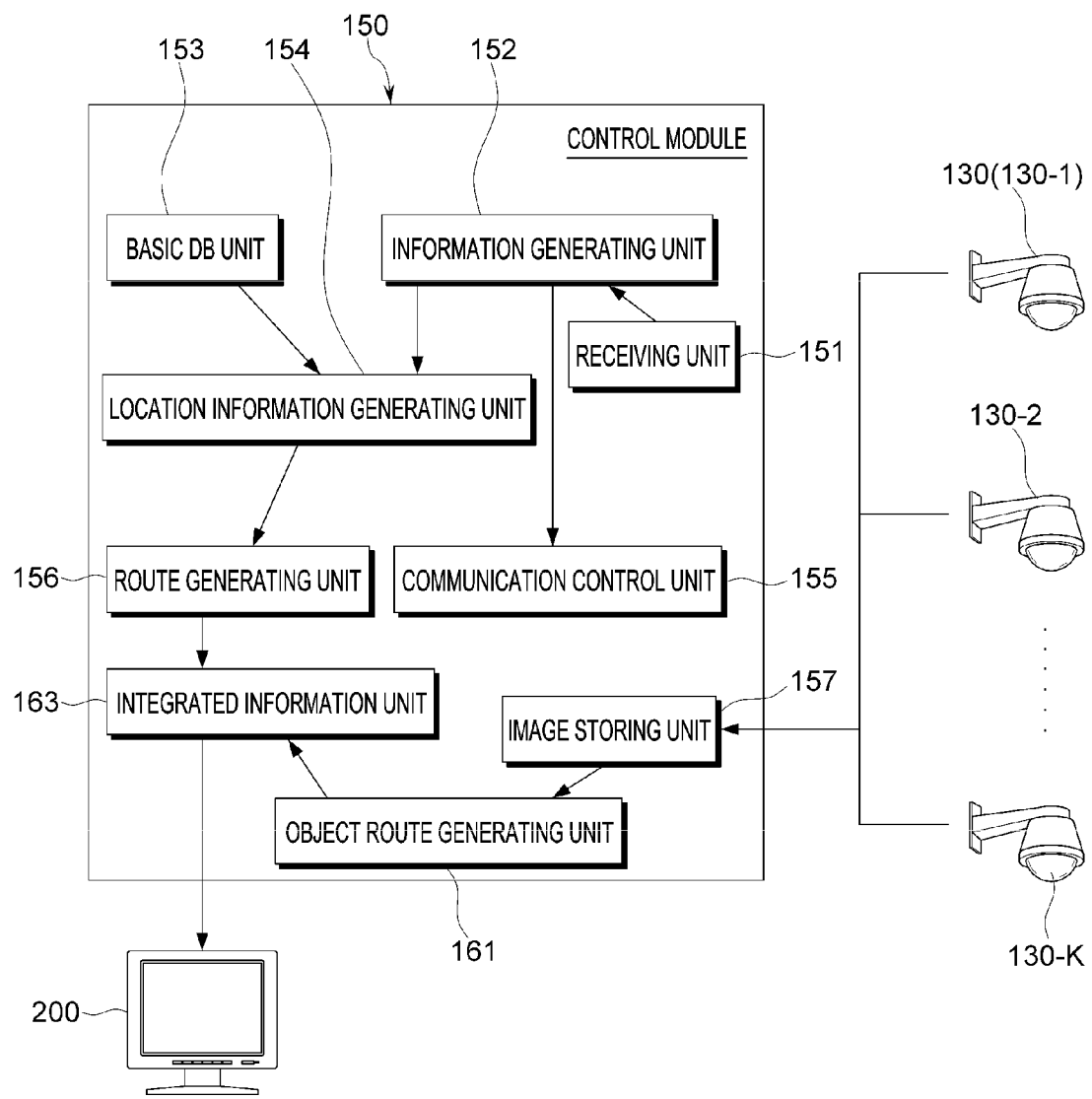
FIG. 6 is a block diagram showing a detailed configuration of an item management system according to still another embodiment of the present disclosure.
Figure 7:
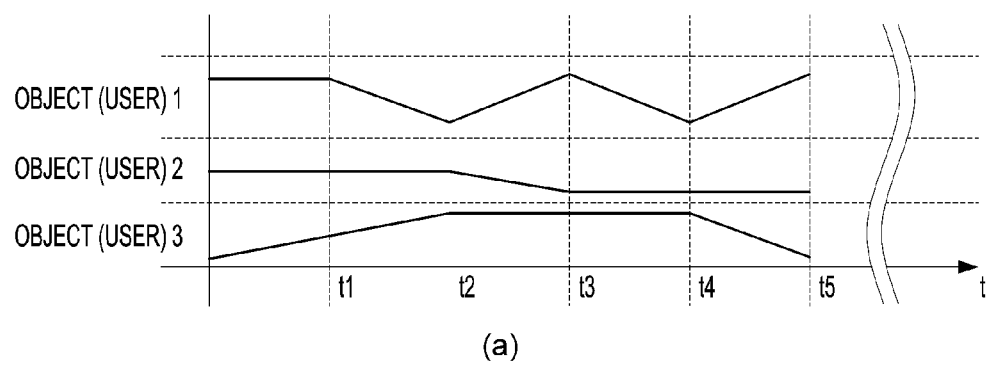
FIG. 7 is a diagram showing an example of transfer route data of an object generated using image data and transfer route data of a wireless tag.
Figure 7:
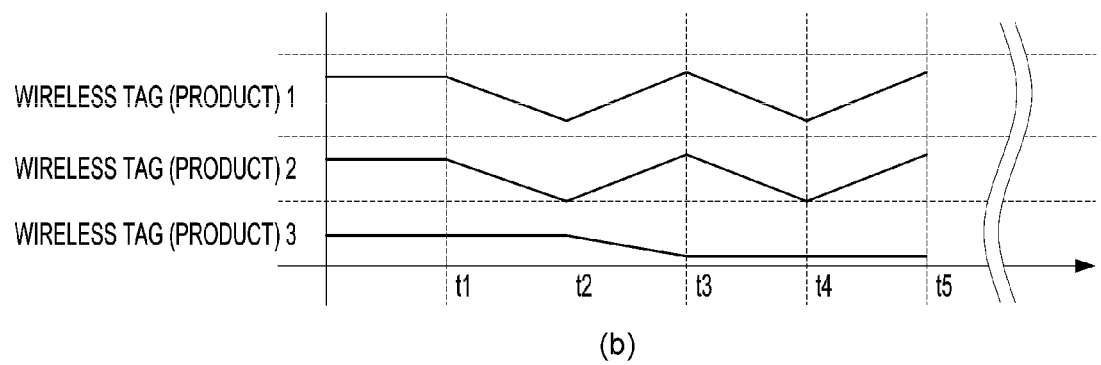
Figure 8:
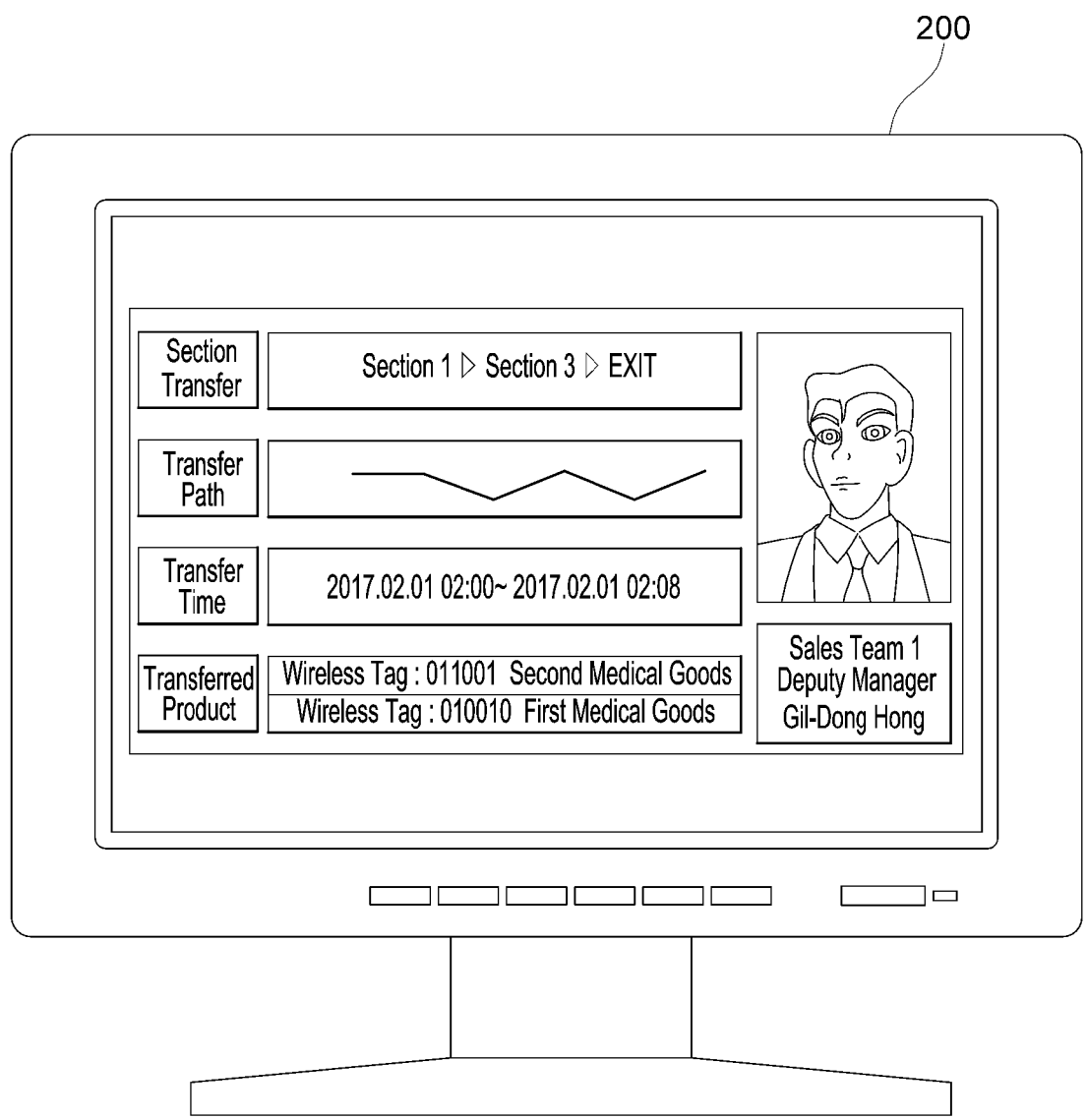

FIG. 6 is a block diagram showing a detailed configuration of a product management system 100 according to still another embodiment of the present disclosure, FIG. 7 is a diagram showing an example of transfer route data of an object generated using image data and transfer route data of a wireless tag, and FIG. 8 is a diagram showing an example of an interface environment of integrated information provided to a manager or the like.

As shown in FIG. 6, the control module 150 of the present disclosure may further include an object route generating unit 161 and an integrated information unit 163, compared to the former embodiments.

The object route generating unit 161 of the present disclosure performs image analysis processing to the image data stored in the image storing unit 157, namely senses an object (an object such as a person that is moved) in the image data, and performs processing to generate route data of the object by tracking the sensed object.

Since the image of a person who transfers the product is mainly tracked in the present disclosure, when the object is sensed in the image data, the size of the region of interest (ROI) is preferably filtered to sense only the object corresponding to the person.

In an embodiment, the transfer by a transfer mechanism, a transfer means or a transfer device may also be sensed by using the size, the feature point or the like of the region of interest, in order to distinguish whether the product is transferred by a person or a transfer mechanism.

Various algorithms for sensing an object in the image data and tracking the sensed object are already known in the art, and they will not be described in detail here since the characteristic feature of the present invention is not therein. In addition, the route data of the object may be generated using a method of mapping the coordinate information in the image data of the transferred object with an actual physical location (actual physical coordinate information).

(a) of FIG. 7 shows an example of the route data of objects (users) generated in this way.

Meanwhile, as described above with reference to FIGS. 2 and 3, if the location information of the wireless tag 110 is changed, the route generating unit 156 of the control module 150 generates the route data of the wireless tag by using the changed location information of the wireless tag 110. The route data of the wireless tag 110 generated by the route generating unit 156 of the present disclosure is shown in (b) of FIG. 7.

The integrated information unit 163 of the present disclosure performs a processing of comparing the route data of the wireless tag 110 generated by the route generating unit 156 and the route data of the object generated by the object route generating unit 161 to distinguish the route data of the wireless tag 110 and the route data of the object which are matched over the reference similarity.

The above processing corresponds to a processing for more effectively extracting an object (a person) who has moved along a path corresponding to the path along which the wireless tag 110, namely the product to which the wireless tag 110 is attached, has been transferred.

If the route data of the wireless tag 110 and the route data of the object which are matched over the reference similarity are selected in this way, the integrated information unit 163 of the present disclosure stores the information about the object in association with the information about the wireless tag 110 corresponding to the selected data, and controls the associated information to be displayed by the display means 200.

The reference similarity may be set in various ways in consideration of efficiency of data processing, reference for judgment of correspondence, or the like.

As shown in FIG. 7, even though an object (user) 3 is sensed and tracked through the image data, since the route data of the wireless tag 110 corresponding to the transfer path of the object 3 is not generated, the object 3 may be simply regarded as a person who only enters and leaves the place or area where the product is stored and managed.

Meanwhile, since the route data of the object 2 and the route data of the third wireless tag 110-3 correspond to each other, the third wireless tag 110-3 may be regarded as being transferred by the object 2, and from the same viewpoint, the first wireless tag 110-1 and the second wireless tag 110-2 may be regarded as being transferred by the object 1.

In this case, the integrated information unit 163 of the present disclosure stores the information of the object 2 in association with the information about the third wireless tag 110-3, and generates and stores the integrated information in which the information of the, object 1 and the information about the first and second wireless tags 110-1, 110-2 are associated.

The information associated in this way is displayed on the display means 200 through the interface environment illustrated in FIG. 8, thereby allowing a manager or the like to integrally check the information about the transferred product and the subject (person) that has performed the product transfer.

If photograph data, human information, identity information and the like of employees is databased in advance, the human information or the identity information of the sensed object may be accurately checked by matching the image data sensed through the image data with the databased photograph data. Thus, as illustrated in FIG. 8, the human information and the photograph information about a person who has performed the product transfer may be stored integrally and displayed on the display means 200.

In this case, in order to apply the facial recognition technology, if feature point information including feature elements of the face (information about eyes, nose, mouth, facial shape, distances and angles between them, etc.) is databased in advance, it is possible to more effectively determine the sameness with the object sensed in the image and check the identity information of the object by using the sameness.

In this case, the integrated information unit 163 of the present disclosure may extract the identity information (the human information) of the sensed object by matching the sensed object with the stored photograph information or the stored feature point information, and store the extracted identity information to be included the information about the object.

As shown in FIG. 8, the integrated information can include information about the transferred product, namely a unique number of the wireless tag and a description of the product. Also, the transfer time, the transfer route, the identity information, the photograph information of the object (the person, the transfer means or the like) may be displayed together with the integrated information.

Meanwhile, if an article such as a metal having a property of scattering a radio wave exists between the reader 120 and the wireless tag 110, the propagation path may be distorted.

In this case, even though the wireless tag 110, namely the product to which the wireless tag 110 is attached, is not transferred actually, the route generating unit 156 of the present disclosure may mistake as the wireless tag 110 is transferred. Thus, if the location information of the wireless tag is changed, preferably, the object route generating unit 161 senses the object or checks whether the route data of the sensed object is generated, and then generates the route data of the wireless tag 110 only when the object is sensed or the route data of the sensed object is generated.

That is, since it is determined whether the product is transferred only when the object is sensed by analyzing the image data and also the transfer of the wireless tag 110 is sensed by analyzing the signal of the wireless tag 110, the error of the transfer information may be minimized, thereby realizing a system capable of sensing the product transfer therethrough.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. A product management system using tag information, comprising:
    a wireless tag provided to each of a plurality of products;
    first to $n^{th}$ readers provided at different locations to receive tag information from the wireless tag, where n is a natural number equal to or greater than 2; and
    a control module configured to control the first to $n^{th}$ readers, the control module comprising:
        a receiving unit configured to receive the tag information;
        an information generating unit configured to generate the received tag information and response frequency information representing receipt of the tag information for each of the first to $n^{th}$ readers;
        a location information generating unit configured to generate location information of the wireless tag by using the response frequency information and the location information of the first to $n^{th}$ readers, the location information generating unit generating the location information of the corresponding wireless tag by proportionally applying a difference in response frequency of the corresponding tag information received from the readers to a separation distance between the two or more readers receiving the same tag information;
        a route generating unit configured to generate route data of the wireless tag when the location information of the wireless tag is changed;
        an image storing unit configured to receive and store image data from a plurality of imaging means that photograph images of regions of the first to $n^{th}$ readers;
        an object route generating unit configured to sense an object by analyzing the received image data and generate route data of the sensed object by matching coordinate information in the image data of the object with actual physical location coordinate information; and
        an integrated information unit configured to store integrated information in which the information about the wireless tag and the information of the object matched with each other are associated, when the route data of the wireless tag and the route data of the object are matched with each other.

2. The product management system using tag information according to claim 1, wherein the reader includes a specification varying unit for variably adjusting a transmission cycle in which the wireless tag transmits the tag information, and
    the control module further includes a communication control unit for controlling the specification varying unit to shorten the transmission cycle when the response frequency information is lower than a reference frequency or when the difference in the response frequency information of the readers receiving the same tag information is lower than a reference difference.

3. The product management system using tag information according to claim 1, wherein the control module includes:
    a tracking image extracting unit configured to extract tracking image data, which is image data of a time zone in which a location change occurs, from the image data of a region where the location change occurs when the location information of the wireless tag is changed; and
    a data processing unit configured to store the extracted tracking image data in association with the information of the wireless tag whose location information is changed.

4. The product management system using tag information according to claim 3, wherein the control module further includes a database (DB) unit in which transfer-planned product information is stored; and the tracking image extracting unit extracts the tracking image data only when the wireless tag whose location information is changed does not correspond to the transfer-planned product information.

5. The product management system using tag information according to claim 1, wherein the integrated information unit matches the sensed object with stored photograph or feature point information to extract identity information of the sensed object and stores the extracted identity information to be included in the integrated information.

* * * * *